United States Patent Office 2,702,965
Patented Mar. 1, 1955

2,702,965

SOIL IMPROVEMENT MIXTURE AND PROCESS

Thomas Boyd, Springfield, Mass., assignor to Monsanto Chemical Company, St. Louis, Mo., a corporation of Delaware No Drawing. Application March 22, 1952, Serial No. 278,110

6 Claims. (Cl. 47—58)

This invention relates to a process for conditioning soil. More particularly the invention relates to a composition of matter especially suitable for addition to soil.

Most soil balls up into a gummy mud when it absorbs considerable amounts of water and becomes hard and dense when the water dries out. Such soils present many difficulties to farmers in that they are too soft to work early in the spring and too hard for proper growing conditions during the hottest part of the summer. One of the methods for overcoming this difficulty has been to work organic matter such as peat moss into the soil. Peat moss and other such organic matter is often difficult to obtain and expensive and its effect on the soil is relatively transient.

One object of this invention is to improve soil.

A further object is to provide a composition which when added to the soil overcomes the natural balling tendencies of the soil when wet and tends to prevent the baking of the soil into a hard cake when dry.

These and other objects are attained by adding to the soil a substantially dry intimate mixture of a polymer of acrylonitrile and an oxide, hydroxide or carbonate of an alkaline earth metal.

The following examples are given in illustration and are not intended as limitations on the scope of this invention. Where parts are mentioned they are parts by weight.

*Example I*

Mix 100 parts of a substantially dry pulverulent polymer of acrylonitrile with 56 parts of substantially dry calcium oxide until an intimate substantially homogeneous mixture is obtained. Add 10 parts of the mixture to 100 parts of dry Miami silt loam and then stir into the mixture 30 parts of water. When a homogeneous mixture of clay, polymer, calcium oxide and water is obtained the clay particles aggregate into small free-flowing crumbly lumps which appear to be substantially dry to the touch. If this homogeneous mixture is allowed to stand at room temperature, circa 25° C., for a few hours a distinct odor of ammonia is observed. In contrast, mix 100 parts of the clay with 30 parts of water as thoroughly as possible. The clay balls up into a large ball of mud which is wet and sticky. The addition of calcium oxide to the clay and water does not improve the aggregation characteristics of the clay.

Spread parts of each of the above mixtures on a glass plate at room temperature, circa 25° C., and allow them to dry for 24 hours. The clay containing the polymer and calcium oxide is still aggregated into small lumps at the end of this time but the clay containing no polymer and calcium oxide is a hard film which crumbles up into a fine dust.

*Example II*

Mix intimately 100 parts of substantially dry pulverulent polymer of acrylonitrile with 56 parts of substantially dry calcium oxide. Add 0.1 part of this mixture to 100 parts of Miami silt loam and stir into the mixture thus obtained 30 parts of water. The clay aggregates into small apparently dry free-flowing crumbly lumps. The odor of ammonia from these aggregates is much less noticeable than from the aggregates made as in Example I.

*Example III*

Mix together intimately 50 parts of a substantially dry pulverulent polymer of acrylonitrile with 50 parts of substantially dry powdered calcium oxide. Add 0.2 part of this mixture to 100 parts of Miami silt loam and stir into the mixture thus obtained 30 parts of water. The clay aggregates into small free-flowing lumps which are dry to the touch.

*Example IV*

Mix together 100 parts of a substantially dry pulverulent copolymer of styrene and acrylonitrile (50–50) with 28 parts of powdered calcium oxide. Add 0.5 part of this mixture to 100 parts of a clayey soil and then mix in 30 parts of water. After thorough mixing, the soil is aggregated into discrete free-flowing particles which seem dry to the touch. When 30 parts of water and 0.1 part of calcium oxide are added to the same soil without the polymer it balls up into a sticky mud.

*Example V*

An intimate mixture of 100 parts of a substantially dry pulverulent polyacrylonitrile and 50 parts of dry pulverulent calcium oxide is prepared by dry blending the two materials. Spread this mixture evenly over unplowed soil containing substantial amounts of clay at the rate of 0.05 pound per 100 square feet of surface area. Harrow the covered area to a depth of about 3 inches and when the harrowing is complete, wet the treated plot thoroughly with water. It will be observed that the soil after the wetting-down is a loose mass of crumbly aggregates. When adjoining soil is harrowed to the same depth without benefit of the polymer-oxide mixture and then wet down it will pack into a dense but slimy mass.

The soil improving composition of this invention is a substantially dry intimate mixture of a polymer or copolymer of acrylonitrile or an alpha substituted acrylonitrile with one or more alkaline earth metal oxides, hydroxides or carbonates.

The polymers of the invention are polymers of acrylonitrile or of alpha substituted acrylonitriles or copolymers thereof with one or more vinylidene compounds in which the acrylonitrile is at least 25 mol percent of the total. The molecular weight of these polymers and copolymers should be above 5,000 as determined by the Staudinger method and they should be substantially insoluble in water.

The compounds which are the second component of the soil additives of this invention are oxides, hydroxides and carbonates of alkaline earth metals including magnesium, calcium, strontium, and barium. For most purposes the calcium compound will be used alone or mixed with minor amounts of compounds of the other alkaline earth metals. The amount of the compound used may vary from as little as 0.1 part to 100 parts based on 100 parts of polymer.

It is essential that the polymer and the alkaline earth compound be in substantially dry pulverulent condition when they are mixed together and the mixture should be maintained in this condition until it is applied to the soil. The mixture in this form is a dry powder which may be easily spread over the soil by fertilizer spreaders or similar means. The mixture may be spread on the surface of the soil and left there until carried into the soil by the natural action of the elements or it may be worked into the soil after spreading by conventional harrowing or cultivating operations. Optimum results are obtained by thoroughly wetting-down the soil after the mixture has been worked into it.

For most soils which contain a substantial amount of clay but which are not primarily clay the amount of the soil additive to be used ranges from 0.1 to 2 pounds or more per 100 square feet of soil. In cases where the soil is predominantly clay the amount of additive necessary will be in the higher range. In sandy soils containing a little clay which are subject to fast runoff of water, the compositions of this invention serve to hold water and prevent too rapid drying. The amount of the composition used for such sandy soils will be considerably less than for the soils containing substantial amounts of clay.

The beneficial soil conditioning properties of the mixtures of this invention develop slowly in contact with the soil. Thus when an intimate mixture of calicum oxide and polyacrylonitrile is worked into three inches of top soil under substantially dry conditions, the improvement of the soil will not be apparent until the soil is moistened either by rain or by deliberate wetting-down. Even then the improvement may not occur for two or three days. However, this slowness of action is actually an advantage since it is a sure indication that the soil conditioner is not easily leached out by ordinary weathering processes and the improvement of the soil will continue over an extended period of time.

However, under conditions making it desirable for the aggregation of the soil to take place substantially immediately, the compositions of this invention may be modified by dry blending therewith a small quantity of an alkaline reacting derivative of an alkali metal in substantially dry pulverulent condition. The amount of alkali metal compound used should be about 0.1% by weight of the alkaline earth compound in the mixture but under some circumstances may be as high as 50% by weight of the alkaline earth compound. With the addition of this third component to the dry mixture, aggregation of the soil is observed almost immediately after the soil properly mixed with the ternary compositions is wetted-down. The alkali metal derivative used will generally be a carbonate, bicarbonate or phosphate of lithium, sodium, potassium, rubidium or cesium. There are two limitations on the type of derivative which may be used. In the first place, it must be alkaline when dissolved in water and secondly it must be non-phytotoxic. Potassium carbonate and potassium meta phosphate are particularly desirable. Salts of weak organic acids such as aliphatic, mono and dicarboxylic acids including acetic, butyric, maleic, etc. acids may be used.

It is essential that the compositions of this invention be an intimate mixture of the various components. The particle size of the polymer, alkaline earth compound and alkali metal compound should be substantially the same so that on dry blending of the components there are no large areas of segregation thereof and the final product is as near to being homogeneous as a mixture of particulate materials can be.

A secondary but still important advantage of this invention is that the composition in contact with the soil at atmospheric temperatures slowly gives off ammonia which may be utilized in part by vegetation as a source of nitrogen. As a result the soil additives of this invention have definite fertilizing qualities as well as soil aggregation and water-retaining qualities.

A further advantage of the compositions of this invention is their efficiency in erosion control. They may be mixed with soil on highway shoulders, cuts in hillsides, steeply sloping grassy areas, etc. They function to put the soil in such condition that it absorbs water rapidly and permits the water to percolate deep into the ground. As a result the surface runoff normally experienced is either entirely eliminated or substantially minimized.

It is obvious that variations may be made in the products and process of this invention without departing from the spirit and scope thereof as defined in the appended claims.

What is claimed is:

1. A process for the improvement of soil which comprises spreading thereon a substantially dry intimate mixture of a pulverulent substantially water-insoluble polymer of an acrylonitrile and a pulverulent compound taken from the group consisting of the oxides, hydroxides and carbonates of alkaline earth metals, working the mixture into the soil and wetting down the soil.

2. A process as in claim 1 wherein the polymer is a polymer of acrylonitrile.

3. A process as in claim 1 wherein the polymer is a substantially water-insoluble copolymer of a vinylidene compound and an acrylonitrile in which the acrylonitrile constitutes at least 25 mol percent of the copolymer.

4. A process as in claim 1 wherein the alkaline earth compound is calcium oxide.

5. A process as in claim 1 wherein the polymer is a copolymer of styrene and acrylonitrile in which the acrylonitrile constitutes at least 25 mol percent of the copolymer.

6. A process for the improvement of soil which comprises spreading thereon a substantially dry intimate mixture of a pulverulent substantially water-insoluble polymer of an acrylonitrile, a pulverulent compound taken from the group consisting of the oxides, hydroxides and carbonates of alkaline earth metals and a pulverulent alkaline reacting non-phytotoxic alkali metal salt of a weak acid, working said mixture into the soil and wetting down the soil.

References Cited in the file of this patent

UNITED STATES PATENTS

| 1,984,417 | Mark | Dec. 18, 1934 |
| 2,459,874 | Fay | Jan. 25, 1949 |
| 2,582,194 | Dudley | Jan. 8, 1952 |
| 2,661,344 | Slocombe | Dec. 1, 1953 |

FOREIGN PATENTS

| 501,726 | Belgium | Mar. 7, 1951 |

OTHER REFERENCES

Bailey, Standard Cyclopedia of Horticulture, vol. 2, pp. 1879–1881, published 1943.